April 14, 1931.  T. McD. YANCEY  1,800,922

MATERIAL UNWINDING APPARATUS

Filed Nov. 30, 1928

Inventor
Thornton M. Yancey
By  Att'y.

Patented Apr. 14, 1931

1,800,922

UNITED STATES PATENT OFFICE

THORNTON McDUFFEY YANCEY, OF OAK PARK, ILLINOIS, ASSIGNOR TO WESTERN ELECTRIC COMPANY, INCORPORATED, OF NEW YORK, N. Y., A CORPORATION OF NEW YORK

MATERIAL-UNWINDING APPARATUS

Application filed November 30, 1928. Serial No. 322,757.

This invention relates to material unwinding apparatus, and more particularly to apparatus for unwinding strand material from a rotatable supply thereof.

When unwinding material from rotatable supplies, particularly large heavy reels, the material is, in some instances, subjected to excessive tension in starting the rotation of the supply reel due to the tendency of the reel to resist turning. If by the use of ball or roller bearings the friction on the supply reel spindle is reduced to a minimum there is a tendency of the reel to over-run the demand on the supply resulting in an objectionable slack in the material. This latter condition is even more pronounced when the demand on the supply is discontinued and sometimes causes snarling or tangling of the material being unwound.

The principal object of the present invention is to provide a simple and inexpensive apparatus for use in connection with material supply reels whereby objectionable stresses and variations of the tension in the material being unwound from such reels are reduced to a minimum.

The invention contemplates the provision of means for controlling the rotation of a material supply reel in accordance with the demand of the material on the supply whereby the tension on the material is maintained substantially constant. In accordance with the novel features of the invention there is provided in one embodiment thereof a grooved pulley arranged to be driven by the material being unwound and operatively connected to the reel through a train of gears constructed so as to prevent over-running of the reel.

Figure 1:
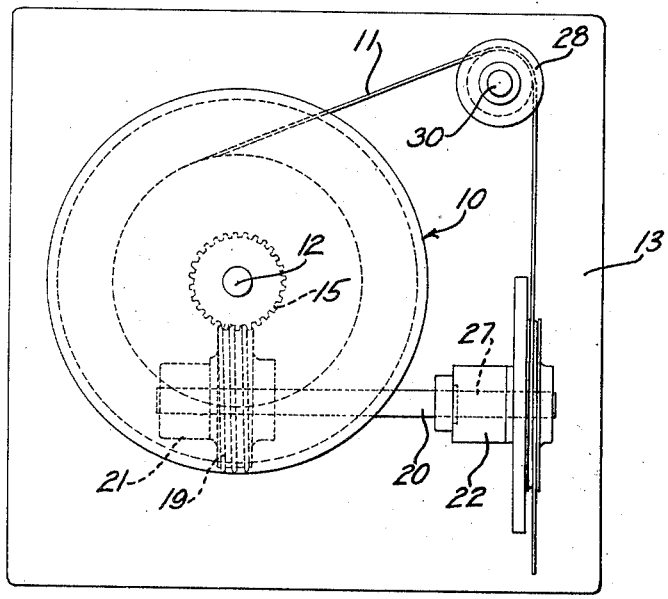
Figure 2:
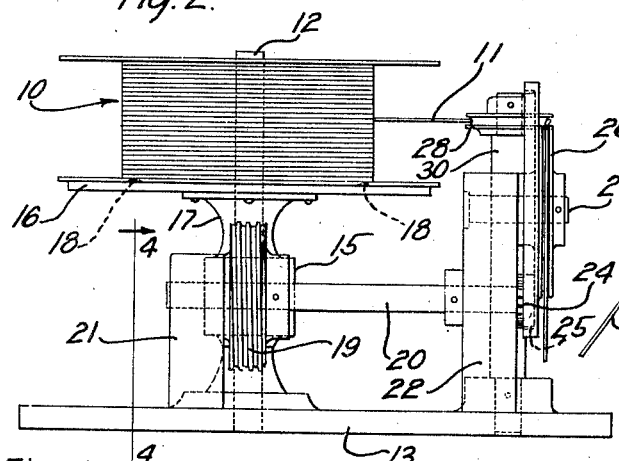
Figure 3:
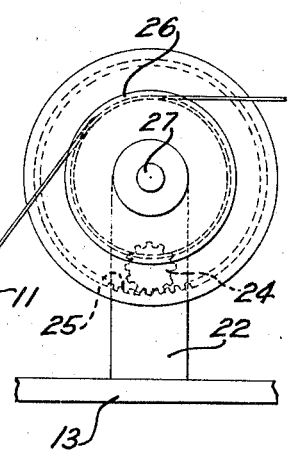
Figure 4:
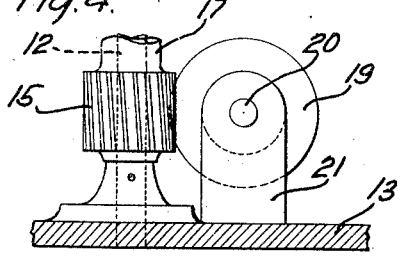

Other features and advantages of the invention will become apparent in the following description, reference being had to the accompanying drawing, wherein Fig. 1 is a top plan view of a material unwinding apparatus embodying the features of the invention as employed in conjunction with a rotatable material supply reel, Fig. 2 is a front elevation thereof, Fig. 3 is a fragmentary side elevational view of a portion of the structure shown in Figs. 1 and 2, and Fig. 4 is a fragmentary detailed section taken on line 4—4 of Fig. 2.

Referring now to the drawing in detail wherein like reference numerals designate corresponding parts throughout the several views, it will be observed that a reel 10 containing a supply of wire or other strand material 11 is shown rotatably supported upon a vertical shaft or spindle 12 secured to a supporting base 13. The supply reel 10 is constrained to rotate with a worm gear 15 rotatably mounted upon the spindle 12. A disc 16, secured to an elongated sleeve 17 formed integral with the gear 15, is provided with a plurality of upwardly projecting lugs or prongs 18, 18 which engage correspondingly shaped apertures provided in the head of the supply reel. The worm gear 15 meshes with a worm 19 secured to a horizontally disposed shaft 20. The worm 19 and the worm gear 15 are constructed with their engaging teeth of such pitch that the gear 15 is capable of being driven by the worm 19 but cannot drive the worm. By this construction the worm gear 15 and the supply reel 10 are positively locked against rotation when the worm 19 is not being driven. The shaft 20 is rotatably journaled in suitable bearing blocks 21 and 22 secured to the supporting base 13. A pinion 24 fixed upon one end of the shaft 20 meshes with an internal gear 25 secured to or formed integral with a grooved pulley 26. The gear 25 and pulley 26 are rotatably supported upon a stud shaft 27 journaled in the bearing block 22. A grooved guide pulley 28 is rotatably supported upon a vertical shaft 30 secured to the base 13. It will be observed that the guide pulley 28 is positioned so that its peripheral groove is in alignment with the peripheral groove of the pulley 26.

In the operation of the above described apparatus, the strand material 11 passes over guide pulley 28 and then makes one or more turns around the grooved pulley 26 whence it may be withdrawn as desired by a twisting machine or any other strand working apparatus. It will be understood that the grooved pulley 26 is frictionally driven by the material being withdrawn in accordance with the tension of the material. In other words, the rotation of the pulley 26 is controlled by the amount of slippage of the material around the pulley which, in turn, is controlled by the tension of the material. The pulley 26 drives the worm 19 through the internal gear 25 and the associated pinion 24. The worm 19, in turn, drives the worm gear 15 thereby permitting and facilitating the rotation of the supply reel by the material being unwound therefrom. Upon the tension of the material decreasing below a certain predetermined value, as for example, when the demand on the supply is discontinued, the frictional driving contact between the material and the pulley 26 is so reduced that the resultant slippage of the material around this pulley is such that the rotation of the pulley by the material is discontinued. The rotation of the supply reel 10 is thereupon also discontinued due to the construction of the worm gear 15 and the worm 19 which, as hereinbefore described, are so designed that the worm 19 is capable of driving the worm gear 15 but cannot be driven by the worm gear. Thus it will be obvious that by employing an apparatus embodying the invention, objectionable stresses and variations in the tension of material being unwound are reduced to a minimum.

Although only one specific application of the invention has been herein illustrated and described it should be understood that the novel features of the invention are capable of various other applications within the scope of the appended claims.

What is claimed is:

1. In an apparatus for unwinding material from a rotatable supply, a member rotated by the material in response to the tension thereof, and means responsive to the rotation of the member for controlling the rotation of the supply, said means comprising a worm and worm gear interconnecting the member and the supply and constructed so as to prevent the supply from over-running the demand upon the material.

2. In material unwinding apparatus, a supply, means for guiding the material away from the supply, and a worm and gear mechanism interconnected between the guiding means and the supply for preventing over-running of the material from the supply.

3. In material unwinding apparatus, a supply, means for guiding the material away from the supply, a worm connected to the guiding means, and a gear connected with the supply, the worm and gear intermeshing to prevent over-running of the material from the supply.

4. In material unwinding apparatus, a supply, a pulley for guiding the material away from the supply and driving the same, a gear connected to the supply, and a helical gear meshing with the gear and connected to the pulley for controlling the unwinding of the supply.

5. In material unwinding apparatus, a supply, a pulley for guiding the material away from the supply and driving the same, an internal gear connected with said pulley, a pinion meshing with the internal gear, a worm driven by the pinion, and a gear connected to the supply, the worm and gear intermeshing to control the unwinding of the supply.

6. In material unwinding apparatus, a supply, a pulley for guiding the material away from the supply and driving the same, an idler pulley interposed between said pulley and the supply to conduct the material therebetween, an internal gear connected with said pulley, a pinion meshing with the internal gear, a worm driven by the pinion, and a gear connected to the supply, the worm and gear intermeshing to control the unwinding of the supply.

7. In strand material unwinding apparatus, a vertical shaft supporting a supply of material, a gear keyed to the shaft, a horizontal driving shaft, a worm keyed thereto and meshing with the gear, a pinion secured to the horizontal driving shaft, an internal gear engaging the pinion, a grooved pulley connected with the internal gear, and a grooved idler pulley mounted on a vertical shaft, the two pulleys conducting the strand material away from the supply and the former having the strand material wrapped a plurality of times therearound for actuating the aforementioned horizontal driving shaft to prevent over-running of the material.

In witness whereof, I hereunto subscribe my name this 21st day of November, A. D., 1928.

THORNTON McDUFFEY YANCEY.